United States Patent
Suemoto

(10) Patent No.: US 7,557,836 B2
(45) Date of Patent: Jul. 7, 2009

(54) CAMERA SYSTEM WITH SELECTABLE PROCESS MODE

(75) Inventor: Kazunori Suemoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 443 days.

(21) Appl. No.: 11/451,403

(22) Filed: Jun. 13, 2006

(65) Prior Publication Data

US 2006/0285004 A1 Dec. 21, 2006

(30) Foreign Application Priority Data

Jun. 15, 2005 (JP) .............................. 2005-175022

(51) Int. Cl.
H04N 5/235 (2006.01)
H04N 5/228 (2006.01)

(52) U.S. Cl. .............................. 348/222.1; 348/211.99; 348/374

(58) Field of Classification Search ............ 348/207.99, 348/211.14, 222.1, 333.01, 333.02, 372, 348/374, 211.99
See application file for complete search history.

(56) References Cited

U.S. PATENT DOCUMENTS 5,585,856 A * 12/1996 Nakaya et al. .............. 348/441

| | | | |
|---|---|---|---|
| 6,130,717 A * | 10/2000 | Arai et al. ................... | 348/360 |
| 6,377,294 B2 * | 4/2002 | Toyofuku et al. ............. | 348/36 |
| 6,519,419 B2 * | 2/2003 | Shimada et al. ............. | 396/277 |
| 7,265,780 B2 * | 9/2007 | Tanaka et al. .......... | 348/207.99 |
| 2002/0018126 A1 * | 2/2002 | Ikeda et al. ................. | 348/222 |
| 2003/0174238 A1 * | 9/2003 | Wu ............................. | 348/373 |

FOREIGN PATENT DOCUMENTS

JP  8-172561 A  7/1996
JP  2000-175089 A  6/2000

* cited by examiner

Primary Examiner—Lin Ye
Assistant Examiner—Gevell Selby
(74) Attorney, Agent, or Firm—Sughrue Mion, PLLC

(57) ABSTRACT

A camera system capable of suitably displaying a through image is provided. A through image signal processing section is provided in a camera head. If signal processing cannot be performed by a digital signal processing section on a camera main body side, a through image is displayed based on a through image signal supplied from the through image signal processing section on the camera head side. In initialization of the camera system, the camera main body side, in advance, requests the camera head side to transmit a list of display modes that can be processed by the through image signal processing section. Subsequently, the through image is displayed in display modes common in the display mode list transmitted from the camera head and a display mode list of a display section in the camera main body.

5 Claims, 14 Drawing Sheets

```
HEAD ID:"XXXXXXXXXXX"
CFA PATTERN:BAYER OR HONEYCOMB
NUNBER OF CCD PIXEL (STILL IMAGE):NUMBER OF HORIZONTAL PIXEL ×
                                 NUMBER OF VERTICAL PIXEL(W1 ,H1)
NUMBER OF CCD PIXEL (THROUGH IMAGE):NUMBER OF HORIZONTAL PIXEL ×
                                 NUMBER OF VERTICAL PIXEL (W2, H2)
NUMBER OF CCD PIXEL (MOVING IMAGE):NUMBER OF HORIZONTAL PIXEL ×
                                 NUMBER OF VERTICAL PIXEL (W3, H3)
EFFECTIVE CAPTURE POSITION:START COORDINATES (X4, Y4),
NUMBER OF HORIZONTAL PIXEL × NUMBER OF VERTICAL PIXEL (W4, H4)
OB POSITION:START COORDINATES (XOB), LENGTH (WOB)
COMPONENT ORDER:RGBG, BGRG, GBGR or GRGB
A/D Bit DEPTH:8 TO 14 bit/PIXEL
CCD DEFECTIVE POSITION: COORDINATES (Xtn,Ytn) × UP TO 256 PIXELS (n=0.255)
```

| RANK | DISPLAY MODE | | CAMERA MAIN BODY | CAMERA HEAD |
|---|---|---|---|---|
| | NUMBER OF PIXELS TO BE DISPLAYED | FRAME RATE | | |
| 1(LOW) | 320 x 240(QVGA) | 10fps | Available | Available |
| 2 | 640 x 480(VGA) | 10fps | Available | Available |
| 3 | ↑ | 15fps | -- | -- |
| 4 | ↑ | 30fps | Available | -- |
| 5 | 1024 x 768(XGA) | ↑ | -- | Available |
| 6 | 1280 x 1024(SXGA) | ↑ | Available | Available |
| 7 | 1280 x 720 p(HDTV) | 60fps | -- | -- |
| 8 | 1920 x 1080 i(HDTV) | ↑ | -- | Available |
| 9(HIGH) | 1920 x 1080 p(HDTV) | ↑ | -- | -- |

(b)

| RANK | DISPLAY MODE | | CAMERA MAIN BODY | CAMERA HEAD |
|---|---|---|---|---|
| | NUMBER OF PIXELS TO BE DISPLAYED | FRAME RATE | | |
| 1(LOW) | 320 x 240(QVGA) | 10fps | Available | Available |
| 2 | 640 x 480(VGA) | 10fps | Available | Available |
| 3 | ↑ | 15fps | -- | -- |
| 4 | ↑ | 30fps | Available | -- |
| 5 | 1024 x 768(XGA) | ↑ | -- | Available |
| 6 | 1280 x 1024(SXGA) | ↑ | Available | Available |
| 7 | 1280 x 720 p(HDTV) | 60fps | -- | -- |
| 8 | 1920 x 1080 i(HDTV) | ↑ | -- | Available |
| 9(HIGH) | 1920 x 1080 p(HDTV) | ↑ | -- | -- |

(c)

| RANK | DISPLAY MODE | | CAMERA MAIN BODY | CAMERA HEAD |
|---|---|---|---|---|
| | NUMBER OF PIXELS TO BE DISPLAYED | FRAME RATE | | |
| 1(LOW) | 320 x 240(QVGA) | 10fps | Available | Available |
| 2 | 640 x 480(VGA) | 10fps | Available | Available |
| 3 | ↑ | 15fps | -- | -- |
| 4 | ↑ | 30fps | Available | -- |
| 5 | 1024 x 768(XGA) | ↑ | -- | Available |
| 6 | 1280 x 1024(SXGA) | ↑ | Available | Available |
| 7 | 1280 x 720 p(HDTV) | 60fps | -- | -- |
| 8 | 1920 x 1080 i(HDTV) | ↑ | -- | Available |
| 9(HIGH) | 1920 x 1080 p(HDTV) | ↑ | -- | -- |

| LANK | DISPLAY MODE | | 
|---|---|---|
| | NUMBER OF PIXELS TO BE DISPLAYED | FRAME RATE |
| 1 (LOW) | 320 × 240 (QVGA) | 10fps |
| 2 | 640 × 480 (VGA) | 10fps |
| 3 | ↑ | 15fps |
| 4 | ↑ | 30fps |
| 5 | 1024 × 768 (XGA) | ↑ |
| 6 | 1280 × 1024 (SXGA) | ↑ |
| 7 | 1280 × 720 p (HDTV) | 60fps |
| 8 | 1920 × 1080 i (HDTV) | ↑ |
| 9 (HIGH) | 1920 × 1080 p (HDTV) | ↑ |

POWER CONSUMPTION
LOW ⬇ HIGH (b)

| LANK | DISPLAY MODE | | CAMERA MAIN BODY | CAMERA HEAD |
|---|---|---|---|---|
| | NUMBER OF PIXELS TO BE DISPLAYED | FLAME RATE | | |
| LOW | 320 × 240 (QVGA) | 10fps | Available | --- |
| | 640 × 480 (VGA) | 10fps | Available | Available |
| MID | ↑ | 15fps | --- | --- |
| | ↑ | 30fps | Available | Available |
| | 1024 × 768 (XGA) | ↑ | --- | Available |
| HIGH | 1280 × 1024 (SXGA) | ↑ | Available | Available |
| | 1280 × 720 p (HDTV) | 60fps | --- | --- |
| | 1920 × 1080 i (HDTV) | ↑ | --- | Available |
| | 1920 × 1080 p (HDTV) | ↑ | --- | --- |

Fig. 12

CAMERA SYSTEM WITH SELECTABLE PROCESS MODE

BACKGROUND OF THE INVENTION

1. Field of the Invention

The present invention relates to a camera system provided with a camera head including an image-taking optical system and an image pickup device and a camera main body which communicates with the camera head, receives an image signal from the camera head, and performs signal processing.

2. Description of the Related Art

There has recently been proposed a camera system provided with a camera head, which includes an image-taking optical system and an image pickup device, and a camera main body, which has the camera head detachably attached thereto, receives an image signal from the camera head, and performs signal processing (refer to, for example, Japanese Patent Application Publication Laid-open Official Gazette No. 8(1996)-172561 and Japanese Patent Application Publication Laid-open Official Gazette No. 2000-175089).

If the camera system as described above is becoming popular, the camera head and the camera main body may be separately sold. Accordingly, there is also a case where, although the camera head and the camera main body are purchased after it is checked that the both are compatible models, it is not realized that the both are incompatible with each other until the time of image-taking, that is, until the camera head is attached to the camera main body. Recently, there is also a camera head including an image pickup device having a special CFA (color filter array) with an arrangement of four colors, R, G, B and emerald green. In the case where such a camera head is attached to the camera main body, it is fully anticipated that there will arise a situation where signal processing cannot be performed with a capacity of a signal conversion processing section in the camera main body. In this case, it is very inconvenient that image-taking cannot be performed.

Accordingly, it is conceivable to directly record image data (hereinafter referred to as RAW data), which is generated by the image pickup device, without performing signal processing. In this way, image-taking can be performed even if the camera head and the camera main body are incompatible with each other.

By recording RAW data in a recording medium and loading the recording medium in a camera main body which can perform signal processing of RAW data, the signal processing can be performed afterwards. However, if an image which is currently captured (hereinafter referred to as a through image) based on RAW data is displayed on a display screen in the same manner as a normal through image is while image-taking is performed, a user may have a strange feeling as if he/she is looking at an unfamiliar image.

SUMMARY OF THE INVENTION

The present invention has been made in view of the above circumstances and provides a camera system capable of suitably displaying a through image.

A camera system of the present invention is a camera system provided with a camera head, which has an image-taking optical system and an image pickup device, and a camera main body, which has the camera head detachably attached thereto, receives an image signal from the camera head, and performs signal processing. In the camera system, the camera head includes a moving image signal processing section which performs signal processing of an image signal for display, the image signal representing a moving image generated by the image pickup device. In addition, the camera head transmits to the camera main body the image signal processed by the moving image signal processing section. Moreover, the camera main body includes a display screen for displaying an image and a display section which displays a moving image on the display screen based on the image signal representing the moving image, which is received from the camera head.

According to the camera system of the present invention, the camera head includes the moving image signal processing section, and the image signal after being processed by the moving image signal processing section is transmitted to the camera main body. Thus, the camera main body can suitably perform display of the moving image on the display screen based on the image signal.

As described above, if the camera head includes the moving image signal processing section, a clear through image is displayed on the display screen, for example, even if the image pickup device included in the camera head is incompatible with the signal processing section included in the camera main body. When image-taking is performed while looking at the clear through image, RAW data generated by the image pickup device can be recorded without signal processing at the signal processing section on the camera main body side.

In other words, a camera system capable of suitably displaying a through image is realized.

Here, it is preferable that the camera system further includes a mode selection section, which compares a first mode list showing modes of image signals that enable display of moving images on the display screen by the display section with a second mode list showing modes of image signals that can be generated by signal processing at the moving image signal processing section, and which selects one of the corresponding modes. Moreover, it is preferable that the signal processing section performs signal processing for the image signal representing the moving image in the mode selected by the mode selection section.

Accordingly, it is also possible to allow the mode selection section to select one of the corresponding modes by comparing the first mode list with the second mode list, for example, a mode with a large number of pixels which displays the clearest image.

Furthermore, in the case where the camera system is operated by power from a battery and includes a battery remaining level detection section which detects a remaining battery level, it is preferable that the mode selection section selects a mode in accordance with the battery remaining level detected by the battery remaining level detection section among the corresponding modes.

Accordingly, it is possible to first select a mode with a large number of pixels among the corresponding modes by comparing the first mode list with the second mode list, and to gradually switch to one of the modes with a smaller number of pixels in response to the battery remaining level as the level thereof becomes smaller.

In other words, it is possible to perform suitable display of an image in response to a battery remaining level.

Moreover, when any mode in the first mode list is incompatible with any mode in the second mode list, it is preferable that the camera head transmits the image signal representing the moving image to the camera main body without performing signal processing for the image signal.

In the case as described above, it is possible to perform processing for prohibiting display of the through image and only for recording the RAW data. Moreover, it is also possible to notify a user of incompatibility between the camera head and the camera main body by displaying an unfamiliar image which is a through image purposely displayed based on the RAW data.

Moreover, in this event, in order to suppress unnecessary power consumption, the moving image signal processing section may be shifted to be in an inoperative state when any one of the modes in the first and second mode lists are incompatible.

Still further, it is preferable that the display section displays the mode selected by the mode selection section on the display screen. Accordingly, it is possible for the user to recognize at a glance that the display mode is, for example, a VGA mode, a XGA mode or the like.

In addition, it is preferable that the mode selection section selects a mode according to a user operation.

Therefore, the through image can be displayed in a user's favorite mode by the user operation.

As described above, a camera system capable of suitably displaying a through image is realized.

BRIEF DESCRIPTION OF THE DRAWINGS

FIG. 3 is a view showing ID information and signal conversion processing information.

FIG. 7 is a view showing lists of display modes of both of the camera main body and the camera head.

FIG. 12 is a view explaining differences in power consumption among the display modes.

DETAILED DESCRIPTION OF THE INVENTION

Embodiments of the present invention will be described below.

Figure 1:
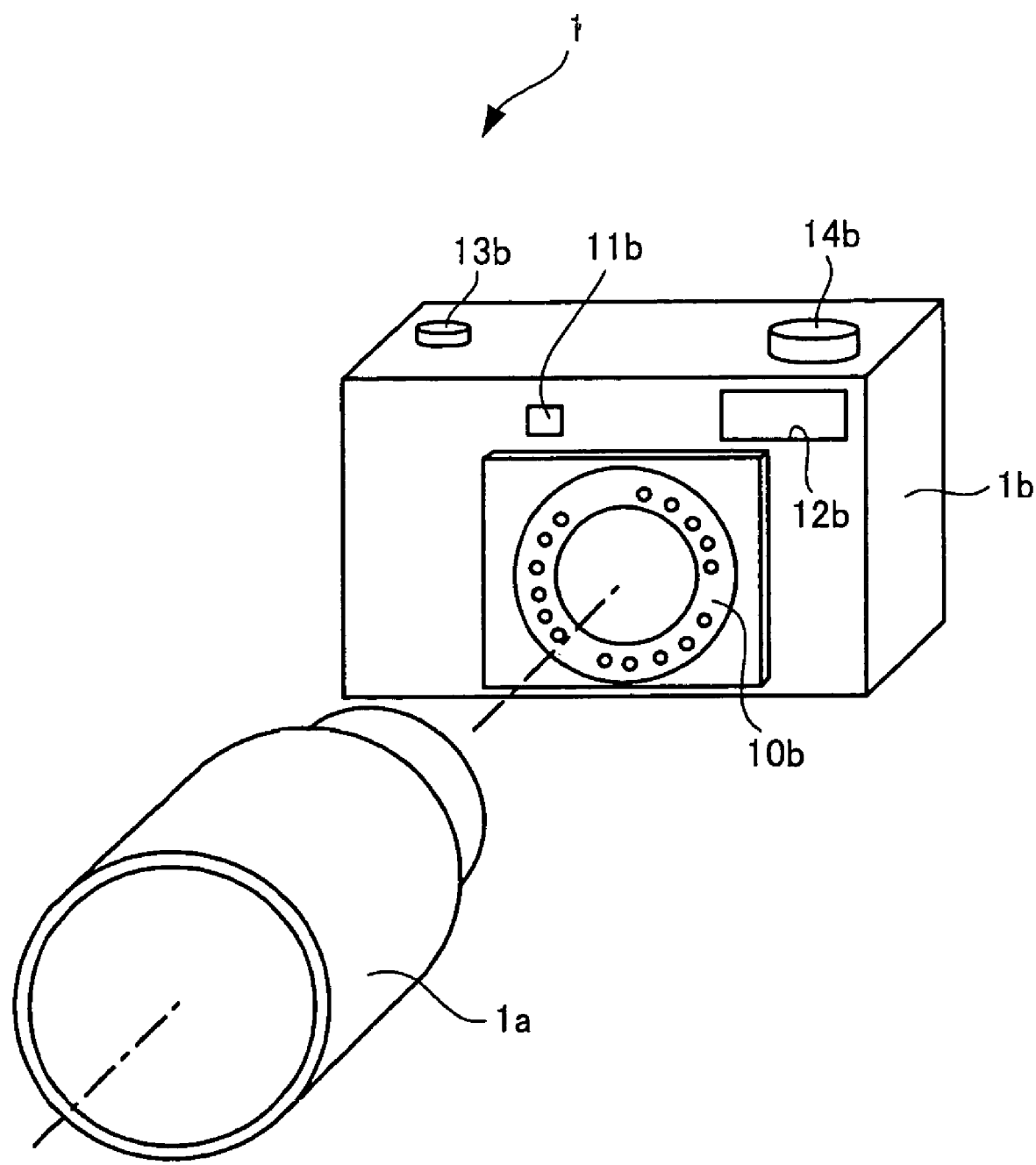
FIG. 1 is a view showing a camera system of an embodiment of the present invention.

FIG. 1 is a view showing a camera system representing an embodiment of the present invention.

As shown in FIG. 1, a camera system 1 of this embodiment includes a camera head 1a and a camera main body 1b. FIG. 1 shows the camera head 1a which includes an image-taking optical system and an image pickup device, and the camera main body 1b which has the camera head 1a detachably attached thereto, receives an image signal from the camera head 1a, and performs signal processing.

The camera head 1a has an external appearance similar to that of a conventional interchangeable lens.

In the center of the camera main body 1b, a head mount 10b having numerous mount contact points is arranged. A similar mount unit is also formed on the camera head 1a side. When the camera head 1a is attached to the camera main body 1b along a dashed line in FIG. 1 in a way of aligning positions of the both mount contact points with each other, the numerous mount contact points are connected to each other, respectively. Accordingly, the camera head 1a and the camera main body 1b are electrically connected to each other.

Each of the numerous mount contact points is allocated to any one of functions for communication and for power supply. Thus, communications are performed both from the camera main body 1b side to the camera head 1a side and from the camera head 1a side to the camera main body 1b side. Moreover, electric power is supplied from the camera main body 1b side to the camera head 1a side.

Above the head mount 10b, an AWB sensor 11b is provided, and by the AWB sensor 11b, a light source type in image-taking is detected. This light source type is, for example, sunlight, fluorescent light, or the like. The light source type is detected by the AWB sensor 11b, and a proper color temperature is set in a digital signal conversion processing section which will be described later. Thus, adjustment of optimum white balance is performed. A flash light emitting window 12b is provided next to the AWB sensor 11b, and a flash light emitting device, which emits flash light through the flash light emitting window 12b, is provided inside the camera main body 1b. Furthermore, on an upper surface of the camera main body 1b, a release button 13b and a mode dial 14b are provided. By use of the mode dial 14b, an image-taking mode or a replay mode is selected. As to the image-taking mode, a still image-taking mode, a moving image-taking mode or the like is further selected. Note that FIG. 1 shows, as an example, one of the camera heads and one of the camera main bodies, respectively. Moreover, on the back side, an operation handler group including a menu button, a LCD panel, and the like are provided.

Here, with reference to FIG. 2, a description will be given of internal configurations of the camera head 1a and the camera main body 1b.

Figure 2:
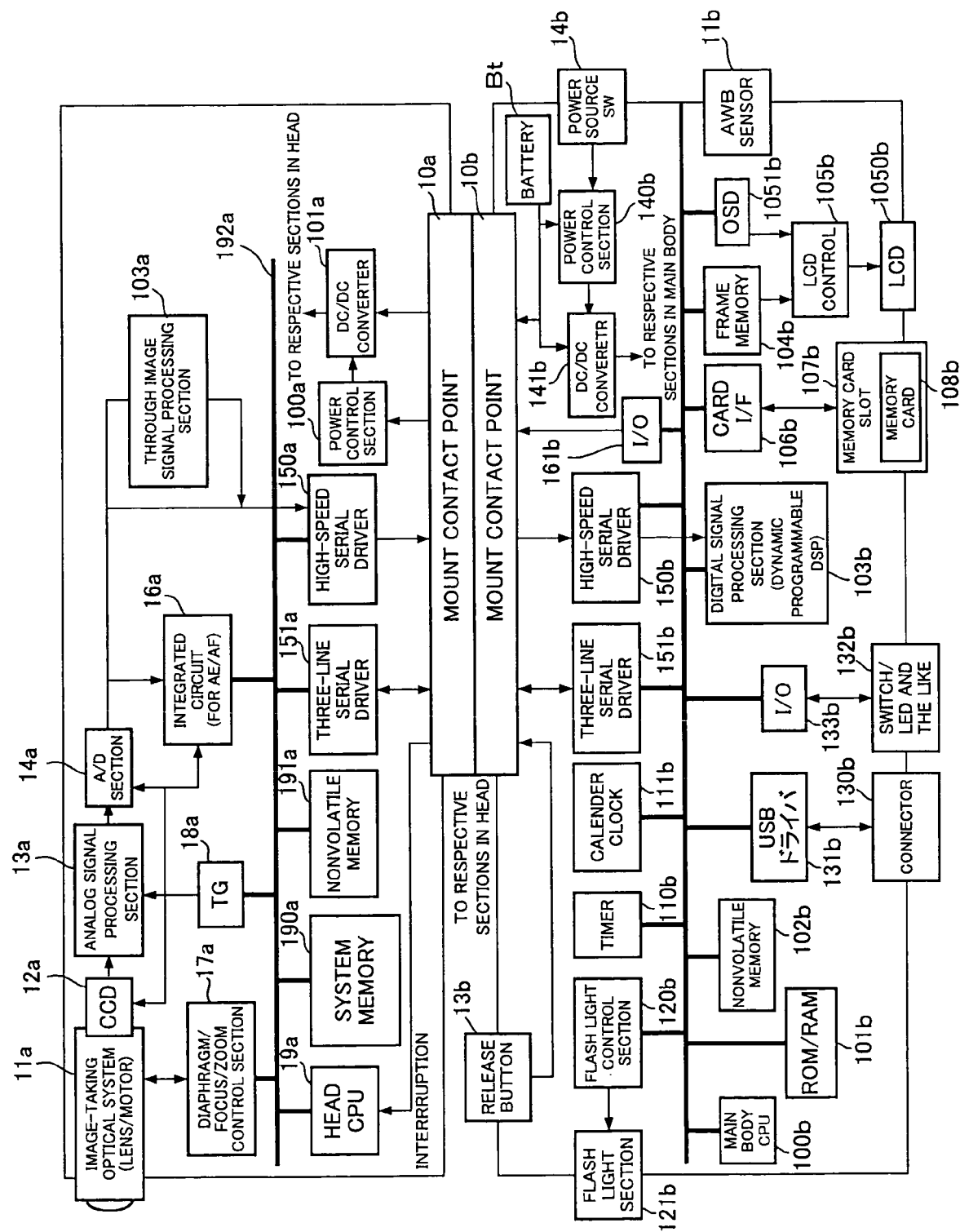
FIG. 2 is a block diagram showing a configuration of an electric system in a state where a camera head 1 is attached to a camera main body 4.

FIG. 2 is a block diagram showing a configuration of an electric system in a state where the camera head 1a is attached to the camera main body 1b.

Respectively, the upper side of FIG. 2 shows the configuration of the camera head 1a, and the lower side of FIG. 2 shows the configuration of the camera main body 1b.

First, the configuration of the camera head 1a will be described.

The camera head 1a included in the camera system 1 of this embodiment is operated by being attached to the camera main body 1b and by receiving power supply from a battery Bt on the camera main body 1b side. A power control section 100a and a DC/DC converter 101a on the camera head 1a side are controlled by a power control section 140b on the camera main body 1b side. Thus, configurations of the power control section 100a and the DC/DC converter 101a on the camera head 1a side will be described together with configurations of the power control section 140b and a DC/DC converter 141b on the camera main body 1b side.

As shown in FIG. 2, the camera head 1a constituting the camera system 1 includes an image-taking optical system 11a and an image pickup device (hereinafter referred to as a CCD, since a CCD solid-state image pickup device is used here) 12a. In the image-taking optical system 11a, a shooting lens, a diaphragm, and the like are provided. An image of a subject is formed on the CCD 12a by the shooting lens in the image-taking optical system 11a, and a piece of image data is generated by the CCD 12a. The piece of image data generated by the CCD 12a is outputted to an analog signal conversion processing section 13a, and the analog signal conversion processing section 13a performs noise reduction processing and the like. Thereafter, a subsequently following A/D section 14a converts an analog image signal into a digital image signal, and then, the digital image signal is supplied to a high-speed serial driver 150a. Through a high-speed serial I/F driven by the high-speed serial driver 150a, the image signal converted into the digital signal is transmitted to the camera main body 1b. Needless to say, a high-speed serial driver 150b which drives the high-speed serial I/F is also provided in the camera main body 1b. Thus, the high-speed serial I/F is driven by the both drivers. Regarding the image signal supplied to the camera main body 1b through the high-speed serial I/F, there are three kinds of image signals, including: an image signal for a through image (hereinafter referred to as a through image signal) to display on a LCD panel (not shown) the subject captured by the shooting lens in the image-taking optical system in a state where any one of the image-taking modes is selected by the mode dial 14b; an image signal representing a still image (hereinafter referred to as a still image signal) which is obtained by operating the release button 13b in a state where the still image-taking mode among the image-taking modes is selected; and an image signal representing a moving image (hereinafter referred to as a moving image signal) which is obtained by operating the release button 13b in a state where the moving image-taking mode among the image-taking modes is selected. Any one of the image signals is transmitted to the camera main body 1b side through the high-speed serial I/F upon request of the camera main body. Moreover, the camera head of this embodiment includes a through image signal processing section. Thus, it is also possible to supply to the camera main body a through image signal processed by the through image signal processing section. If the camera main body detects that the camera head is incompatible when the camera head is attached to the camera main body and configuration information on the image pickup device and the like on the camera head side is transmitted to the camera main body, the camera main body can also request transmission of the through image signal to the camera head through a three-line serial I/F.

Meanwhile, the image signal converted into the digital signal by the A/D section 14a is also supplied to an integration circuit 16a provided subsequent to the A/D section 14a. The integration circuit 16a realizes an AF function (hereinafter referred to as AF) and an AE function (hereinafter referred to as AE). The integrated circuit 16a measures luminance of field for performing the AE and a subject distance for performing the AF. The subject distance and the field brightness, which are measured by the integration circuit 16a, are supplied to a diaphragm/focus/zoom control section 17a through a data I/F 192a. By the diaphragm/focus/zoom control section 17a, a diameter of the diaphragm in the image-taking optical system is adjusted or a position of a focus lens in the image-taking optical system is adjusted. Accordingly, every time the lens in the image-taking optical system included in the camera head 1a is directed to a different subject, the AF and the AE are operated to immediately adjust focus and brightness. Thus, image data representing the subject brought into focus is generated by the CCD 12a and outputted from the CCD 12a.

The CCD 12a, the analog signal conversion processing section 13a, the A/D section 14a, and the integration circuit 16a are operated in synchronization with a timing signal from a timing generator (hereinafter referred to as a TG) 18a. Operations of the TG 18a are controlled by a CPU 19a. This head CPU 19a controls the TG 18a, the diaphragm/focus/zoom control section 17a and the like according to procedures of programs stored in a system memory 190a. The system memory 190a stores programs indicating processing procedures of the AE and the AF, processing procedures concerning communication through the serial I/F, and the like. Moreover, in terms of the programs, the following programs are also stored, including: a through image processing program and a still image processing program which are started when the image-taking mode is selected by the mode dial and the still image-taking mode is selected; a moving image processing program which is started when the moving image-taking mode is selected; and the like. According to the processing procedures described above, the operations of the integration circuit 16a, the operations of the TG 18a, read/write operations of a nonvolatile memory 191a, operations of a three-line serial driver 151a, the operations of the high-speed serial driver 150a, and the like are all controlled by the head CPU 19a.

Moreover, the nonvolatile memory 191a nonvolatily stores the following information, including: ID information for identifying a camera head; and signal conversion processing information required for signal processing in the camera main body 1b for the image signal transmitted to the camera main body 1b from the camera head 1a. When a command representing a request to transmit the information described above is transmitted from the camera main body 1b through the three-line serial I/F, either only the ID information or both of the ID information and the signal conversion processing information in the nonvolatile memory 191a is/are transmitted to the camera main body 1b through the three-line serial I/F. A three-line serial driver 151b which drives the three-line serial I/F is also provided in the camera main body 1b side. Through the serial I/F driven by the both drivers, commands are exchanged from the camera main body 1b to the camera head 1a or from the camera head 1a to the camera main body 1b. For example, in the case where a command requiring to transmit the ID information is transmitted from the camera main body 1b to the camera head 1a, the ID information or the signal conversion processing information (the configuration information described above) is transmitted from the camera head 1a to the camera main body 1b through the three-line serial I/F in response to the command. Moreover, in the case where a command corresponding to a request to transmit the image signal is transmitted from the camera main body 1b through communication, the image signal converted into the digital signal is transmitted to the camera main body 1b through the high-speed serial I/F, the transmission rate of which is faster than that of the three-line serial I/F.

Figure 4:
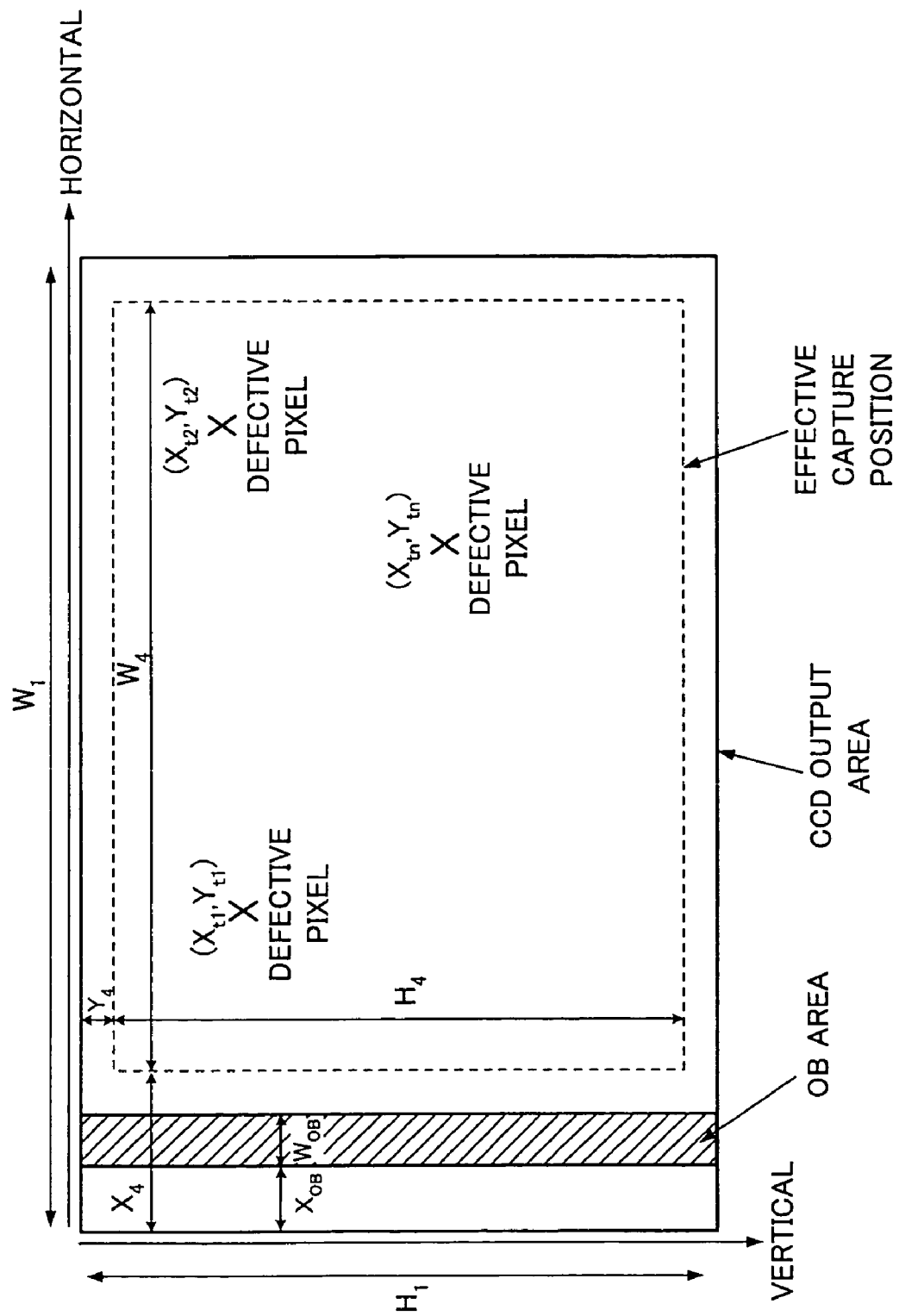
FIG. 4 is a view explaining meanings of the signal conversion processing information shown in FIG. 3.

Here, putting FIG. 2 aside, a description will be given of contents of the configuration of the ID information and the signal conversion processing information which are stored in the nonvolatile memory 191a, with reference to FIGS. 3 and 4.

FIG. 3 is a view showing the ID information and the signal conversion processing information. FIG. 4 is a view showing an imaging area of the CCD 12a, and explaining meanings of the signal conversion processing information shown in FIG. 3.

The ID information is shown in the top part of FIG. 3, and the signal conversion processing information is shown therebelow. The ID information shown in FIG. 3 is, for example, an ID number for identifying this camera head, and the like. This ID number is downloaded into the camera main body when the camera head is attached thereto. Thus, a main body CPU 100b (see FIG. 2) on the camera main body side recognizes what kind of camera head is attached to the camera main body. Although the signal conversion processing information shown in FIG. 3 is one that the camera head 1a has, the camera main body 1b also has the signal conversion processing information shown in FIG. 3 in this embodiment. Therefore, in the case where ID information is downloaded from the camera head 1a, if there is signal conversion processing information corresponding to the ID information, the signal conversion processing information is set in a digital signal conversion processing section 103b. In other words; if the ID information is one that the camera main body has, it is not necessary to bother to download the signal conversion processing information from the camera head 1a.

However, in consideration of a memory capacity on the camera main body side, it is inefficient to store all the ID information and signal conversion processing information. Thus, it is made possible to download the signal conversion processing information shown in FIG. 3 from the camera head.

As the signal conversion processing information, in the order from top to bottom, CFA arrangement in the CCD 12a, the number of pixels in the CCD 12a (in three kinds of the cases: the case of a still image, the case of a through image and the case of a moving image), coordinates indicating an effective capture position and the number of pixels, coordinates indicating a position of optical black (hereinafter referred to as OB) to be a reference of a black level, a component order, an A/D bit depth, a CCD defective position, and the like are shown.

Moreover, in the signal conversion processing information shown in FIG. 3, the number of pixels is indicated by a combination (W, H) of the number of horizontal pixels W and the number of vertical pixels H. This (W, H) represents the number of pixels in a horizontal direction and the number of pixels in a vertical direction, as shown in FIG. 4. A note W1 represents the maximum number of pixels in a width direction of the image pickup surface, and a note H1 represents the maximum number of pixels in a height direction of the image pickup surface. The case of (W1, H1) Specifically shows that all pixels in the CCD 12a are used to generate a still image signal, as a piece of the signal conversion processing information. Moreover, as a piece of the signal conversion processing information, it is indicated that: a through image signal is generated by use of a fewer number of pixels (W2, H2) than the number of pixels (W1, H1) of the still image signal; and a moving image signal is also generated by use of a fewer number of pixels (W3, H3) than the number of pixels (W1, H1) of the still image signal. Moreover, it is shown that the coordinates of an effective capture position of the through image signal, the moving image signal and the like are indicated by (X, Y), and that the number of pixels within the effective capture area (an area indicated by the dotted line in FIG. 4) is indicated by a combination (W4, H4).

Furthermore, on the image pickup surface of the CCD 12a, an area called optical black (hereinafter referred to as OB) is provided, which is for notifying the digital signal conversion processing section 103b on the camera main body 1b side of a black level when an image is taken by the CCD 12a. The starting coordinates (XOB) and a length (WOB) of this OB area are respectively indicated as a piece of the signal conversion processing information.

Moreover, as a piece of the signal conversion processing information, it is also shown that how many bits of data are used for one pixel in A/D conversion bit depth. This number of bits per pixel ranges from 8 bits to 14 bits, and this number of bits is shown as apiece of the signal conversion processing information. Furthermore, as a piece of the signal conversion processing information, the CCD defective position also represents coordinates (X, Y) of a defective pixel. FIG. 4 shows that there are defective pixels at three points including (Xt1, Yt1), (Xt2, Yt2) and (Xtn, Ytn). In the case where there are defective pixels, the defective pixels are repaired by performing interpolation processing and the like by use of pixels adjacent to the defective pixels.

When such signal conversion processing information is set in the digital signal conversion processing section 103b on the camera main body 1b side, the image signal received through the high-speed serial I/F is subjected to suitable processing in accordance with the CCD in the camera head.

The configuration of the camera head 1a has been described above.

With reference to FIG. 2 again, the configuration of the camera main body 1b will be described.

Operations of the camera main body 1b are all controlled by the main body CPU 100b. On the camera main body 1b side, a system memory 101b and a nonvolatile memory 102b are also provided. Specifically, the system memory 101b stores programs and the nonvolatile memory 102b is a writable memory for nonvolatily storing ID information and signal conversion processing information, which are transmitted from the camera head 1a side. Note that, in the system memory 101b, a program indicating main processing procedures of the camera system is written. In the program, processing procedures in the case where processing of the through image signal is performed in cooperation with the head CPU 19a on the camera head 1a side, processing procedures in the case where processing of the still image signal is performed, and processing procedures in the case where processing of, the moving image signal is performed are also written.

According to the programs stored in the system memory 101b, the main body CPU 100b controls exchange of commands through the three-line serial I/F, reception of the image signal through the high-speed serial I/F, and the like. The three-line serial I/F is driven by the three-line serial driver 151b, and the high-speed serial I/F is driven by the high-speed serial driver 150b. The operations of the drivers described above are controlled by the main body CPU 100b, respectively.

As described above, the three-line serial driver 151a on the camera head side and the three-line serial driver 151b on the camera main body side drive the serial I/F to exchange commands. When a command indicating a request to transmit ID information and signal conversion processing information is transmitted to the camera head 1a through the three-line serial I/F from the camera main body 1*b*, the head CPU 19*a* reads the ID information and the signal conversion processing information stored in the nonvolatile memory 191*a* in the camera head 1*a*. Subsequently the ID information and the signal conversion processing information are supplied to the three-line serial driver 151*a*, and then, are transmitted to the camera main body 1*b* through the three-line serial I/F. When the ID information and the signal conversion processing information are transmitted to the camera main body 1*b* in the above manner, the ID information and the signal conversion processing information are received by the three-line serial driver 151*b* under control of the main body CPU 100*b*. Moreover, the ID information and the signal conversion processing information are stored in the nonvolatile memory 102*b*. This nonvolatile memory 102*b* is a memory which has a capacity to store pairs of ID information and signal conversion processing information for plural camera heads. When a camera head which has an ID information other than the ID information previously stored in the nonvolatile memory in the camera main body 1*b* is attached to the main body, the ID information and the signal conversion processing information regarding to the camera head are downloaded and stored.

The request to transmit the ID information and the signal conversion processing information by use of the three-line serial I/F is made when either one of the following events occurs: attachment of the camera head 1*a* or turning-on the power by a power source SW14*b*. When either one of the events occurs, power is supplied to the respective sections including the main body CPU 100*b* through the power control section 140*b* and the DC/DC converter, both of which constantly receive power supply from the battery Bt. In this event, the power is also supplied to the DC/DC converter on the camera head side through the mount contact points. Thus, the power is supplied to the respective sections in the camera head. Thereafter, the main body CPU 100*b* controls the three-line serial driver 151*b* and requests the camera head 1*a* to transmit the ID information through the serial I/F driven by the three-line serial driver 151*b*. When the received ID information does not coincide with the ID information stored in the nonvolatile memory 102*b*, the main body CPU 100*b* requests the camera head 1*a* to transmit the signal conversion processing information. Thereafter, the main body CPU 100*b* performs processing of storing the received ID information and the signal conversion processing information in the nonvolatile memory 102*b*.

As described above, when the camera head 1*a* is attached to the main body or when the power switch 14*b* is turned on, the ID information, and in some cases the signal conversion processing information corresponding thereto, are stored in the nonvolatile memory 102*b* under control of the main body CPU. Moreover, when the signal conversion processing information is set in the signal conversion processing section 103*b*, the camera system 1 becomes in a standby state for image-taking.

However, in such a case as where the image pickup device has a CFA (color filter array) including, for example, an emerald green filter indicated in the signal conversion processing information transmitted from the attached camera head, there may occur a situation where signal processing cannot be performed by the signal conversion processing section. It is inconvenient if such a situation occurs and image-taking cannot be performed. Thus, here, the main body CPU 100*b* determines whether or not the signal processing can be performed by the digital signal conversion processing section 103*b*, based on the ID number and the signal conversion processing information, which are transmitted from the camera head side 1*a*. In the case where, as a result of determination of whether or not the signal processing can be performed, the main body CPU 100*b* determines that signal processing corresponding to the signal conversion processing information transmitted from the camera head 1*a* cannot be performed by the digital signal conversion processing section 103*b*, so-called RAW data is recorded in a memory card which is a recording medium, without performing the signal processing by the signal conversion processing section 103*b* or without performing the signal processing except for repairing defective pixels.

Moreover, in this embodiment, in order to enable display of a through image as clear as possible on the LCD panel on the camera main body side, a through image signal processing section 103*a* is provided in the camera head 1*a*. Accordingly, upon receipt of a through image signal supplied from the through image signal processing section 103*a*, the through image is displayed on the panel of a LCD 1050*b*. In this embodiment, in the case where the main body CPU 100*b* determines that the signal processing cannot be performed by the signal processing section 103*b* on the camera main body 1*b* side, a request to transmit a through image signal generated by the through image signal processing section 103*a* is transmitted to the head CPU 19*a* by use of the three line serial I/F. Thus, the through image signal is transmitted to the camera main body side from the camera head side. More specifically, in displaying the through image based on the through image signal, the following processing is performed. First, the main body CPU 100*b* sends the camera head side a request to transmit a display mode list (hereinafter referred to as a map request) before sending the request to transmit the through image signal. Thereby, a second mode list so-called in the present invention is transmitted to the main body side, the second mode list showing modes of image signals that can be generated in the signal processing by the through image signal processing section 103*a*. Thereafter, the second mode list is compared with a first mode list so called in the present invention, which is previously stored in the nonvolatile memory on the camera main body side and shows modes of image signals that enable display of moving images on the LCD panel by a LCD control section. Subsequently, a display mode common in the both lists is selected. Thus, in displaying the through image on the display screen, a clear through image can be displayed by use of a display mode common in both of the camera head and the camera main body.

As described above, in this embodiment, the main body CPU 100*b* recognizes the type of the camera head 1*a* based on the ID number downloaded from the camera head 1*a* attached to the camera main body 1*b*. Moreover, the main body CPU 100*b* determines whether or not the signal processing can be performed for the image signal received from the camera head 1*a*, based on the signal conversion processing information corresponding to the ID number. Furthermore, the main body CPU 100*b* also sends the display map request and determines whether or not the through image can be clearly displayed. Thus, various ideas have been devised to suitably perform image-taking by use of the camera system.

In the case where the signal processing cannot be performed by the digital signal processing section 103*b* on the camera main body 1*b* side, as described above, the through image based on the through image signal processed by the through image signal processing section 103*a* on the camera head 1*a* side is displayed. Thus, the through image is clearly displayed. In this event, a command indicating a request to transmit a through image signal is transmitted to the camera head 1*a* through the three-line serial I/F from the camera main body 1*b*. In response to the request to transmit a through image signal, the head CPU 19*a* on the camera head 1*a* side allows the through image signal processing section 103a to generate the through image signal and to transmit the signal to the camera main body 1b through the high-speed serial I/F driven by the high-speed serial driver. Thereafter, the main body CPU 100b on the camera main body 1b side stores the received image data in the frame memory 104b. Subsequently, a YC signal, which is the through image signal generated by the through image signal processing section 103a on the camera head 1a side and which is stored in the frame memory 104b, is supplied to the LCD control section 105b. Accordingly, the LCD control section 105b displays the through image on the panel of the LCD 1050b.

The frame memory 104b, the LCD control section 105b and the LCD 1050b correspond to a display section in the present invention.

Thus, the through image can be surely displayed even if the signal processing cannot be performed on the camera main body side.

When the release button 13b is pressed while looking at the through image, an interrupt signal is supplied to both of the main body CPU 100b and the head CPU 19a. Thus, processing of the through image is interrupted, and the still image processing program written in the system memory is started by an external interrupt. As shown in FIG. 2, when the release button 13b is pressed, a release signal is inputted directly to external interrupt input pins in both of the main body CPU 100b and the head CPU 19a. The head CPU 19a on the camera head 1a side supplies a signal to start exposure from the TG 18a to the CCD 12a in the interrupt timing when the release button 13a is pressed, and allows the CCD 12a to start the exposure. Thereafter, the head CPU 19a supplies a signal to finish the exposure from the TG 18a to the CCD 12a, and allows the CCD 12a to output a still image signal formed of all pixel data to the analog signal processing section 13a. The still image signal outputted to the analog signal conversion processing section 13a is supplied from the analog signal-conversion processing section to the digital signal conversion processing section 103b through the A/D section 14a and the high-speed serial I/F 150a. Moreover, under control of the main body CPU, a JPEG file compressed by the signal conversion processing section 103b is stored in a memory card 108b inserted into a memory card slot 107b through a card I/F 106b. When the mode dial 14b is set to the moving image mode, by operating the release button 13b, interruption is caused, and the moving image processing program is activated. Thereafter, moving image signals are supplied to the digital signal conversion processing section 103b through the high-speed serial I/F at predetermined intervals. Subsequently, the signals are compressed in a motion-JPEG or MPEG format and recorded in the memory card 108b. Moreover, when the signal processing cannot be performed by the digital signal processing section on the camera main body side, the RAW data is recorded as it is.

Here, with reference to FIG. 5, a detailed description will be given of operations of the digital signal conversion processing section 103b in which the signal conversion processing information is set.

Figure 5:
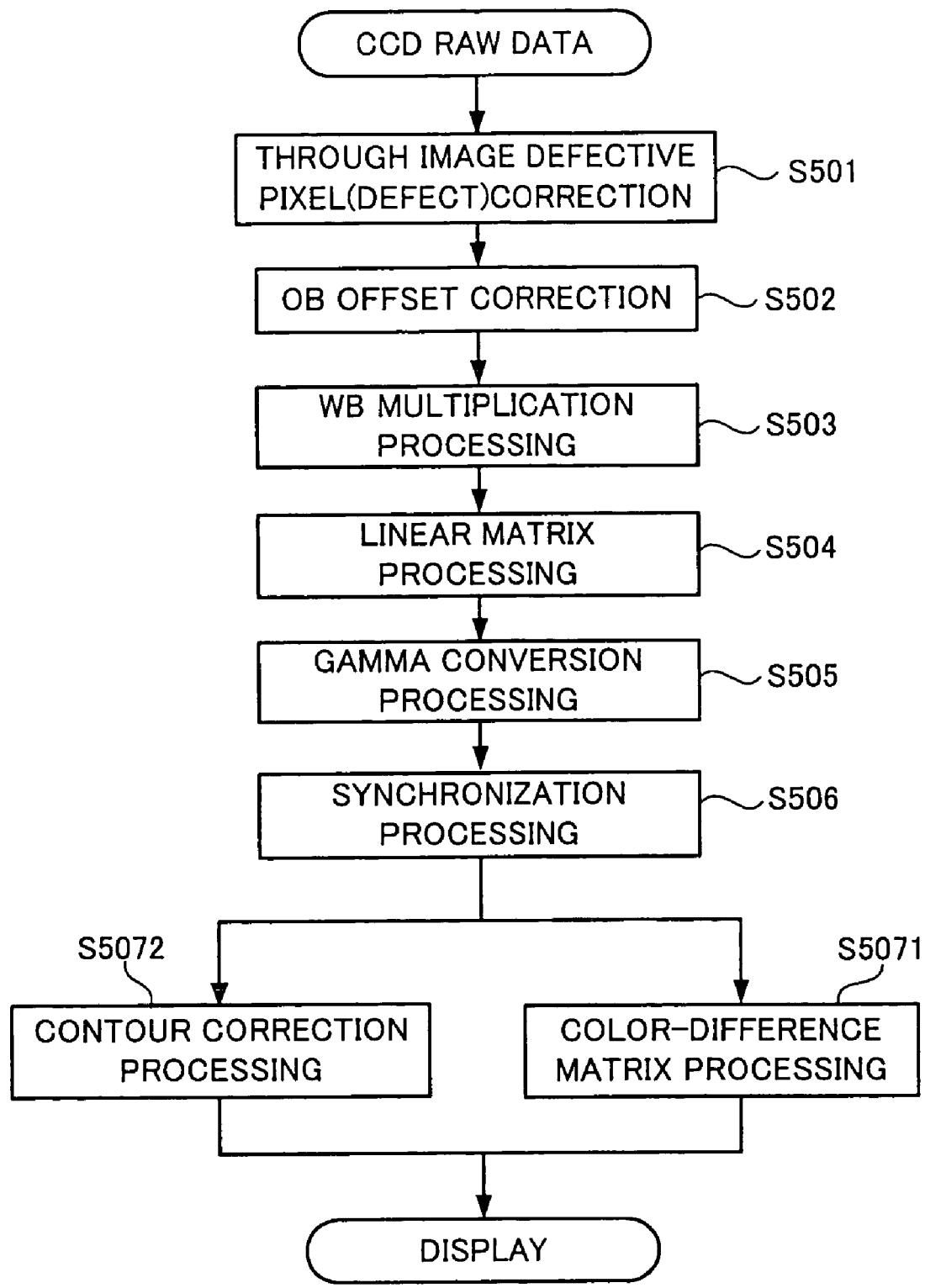
FIG. 5 is a view showing a configuration of a digital signal conversion processing section.

FIG. 5 is a view for explaining signal conversion processing procedures executed by the digital signal conversion processing section 103b.

The digital signal conversion processing section 103b is configured with a so-called dynamic programmable DSP (digital signal processor). When the signal conversion processing information is set in the digital signal conversion processing section 103b from the outside, processing corresponding to the signal conversion processing information is performed. Here, if the signal conversion processing information shown in FIG. 3 corresponds to the capacity of the digital signal conversion processing section 103b configured with the DSP, the signal conversion processing information is set in the digital signal conversion processing section 103b. When a through image signal, a still image signal and a moving image signal are transmitted from the camera head 1a side through the high-speed serial I/F to the digital signal conversion processing section 103b in which the signal conversion processing information is set, signal processing based on the signal conversion processing information is performed for the through image signal, the still image signal or the moving image signal.

FIG. 5 shows a process when a through image is displayed on the panel of the LCD 1050b. With reference to FIG. 5, a description will be given of signal processing of a through image signal by the digital signal conversion processing section 103b.

As shown in FIG. 5, first, defective pixels correction processing is performed in step S501, and OB offset correction processing is performed in the next step S502. In correction of the defective pixels (defects) in step S501, interpolation processing is performed by use of pixels around the defective pixels as shown in FIG. 4. Thus, the defective pixels are restored. Moreover, in the OB offset processing in step S502, an image signal in the OB area shown in FIG. 3 is defined as a reference level (black level), and an image signal outside the OB area is clamped to the reference level. This clamp processing corresponds to the OB offset correction processing. After the offset correction processing which adjusts the black level, then in step 503, a white balance adjustment in which a white level is coordinated for the black level is performed. The white is generated by additive color mixing of R, G and B. Highly-pure white cannot be obtained unless gains of respective R, G and B signals are adjusted so as to be equal each other. Here, in order to obtain highly-pure white, processing of adjusting the respective gains of R, G and B is performed depending on a color temperature of a light source type detected by the AWB sensor 11b. After the white balance adjustment is performed by adjusting the respective gains of R, G and B as described above, linear matrix processing is performed in step S504. To be more specific, a RGB signal is converted into a YCC signal composed of a luminance signal and a chromaticity signal. Here, a Y signal, a Cr signal and a Cb signal are obtained by multiplying R, G and B, for example, by a color conversion matrix of 3×3. In order to increase contrast, for example, conversion into a YC signal is performed by putting a weight to a diagonal element among coefficients in the 3×3 color conversion matrix, whereby a YC signal which is composed of the luminance signal and the chromaticity signal, and has the contrast increased, and the like are generated. In the next step S505, gamma correction is performed for the Y signal. Moreover, the Y signal and the C signal are synchronized in the next step S506. Thereafter, contour emphasis processing is performed in step S5072 as processing on the luminance signal (Y) side. At the same time, color-difference matrix processing is performed in step S5071 as processing on the chroma signal (C) side. After the processing in the both sides is finished, the through image signal, which can be displayed, is stored in the frame memory. Subsequently, the through image based on the through image signal stored in the frame memory is displayed on the LCD panel.

Thus, the signal conversion processing information downloaded from the camera head 1a is set in the digital signal conversion processing section 103b, and processing of the image signal is performed by the digital signal conversion processing section 103b according to the contents set therein.

As described above, in this embodiment, when the camera head, in which the signal processing cannot be performed by the signal processing section shown in FIG. 5, is attached to the main body, a request to transmit the second mode list showing the modes of image signals that can be generated by the through image signal processing section 103a included in the camera head, in other words, the map request is sent to the camera head.

Figure 6:
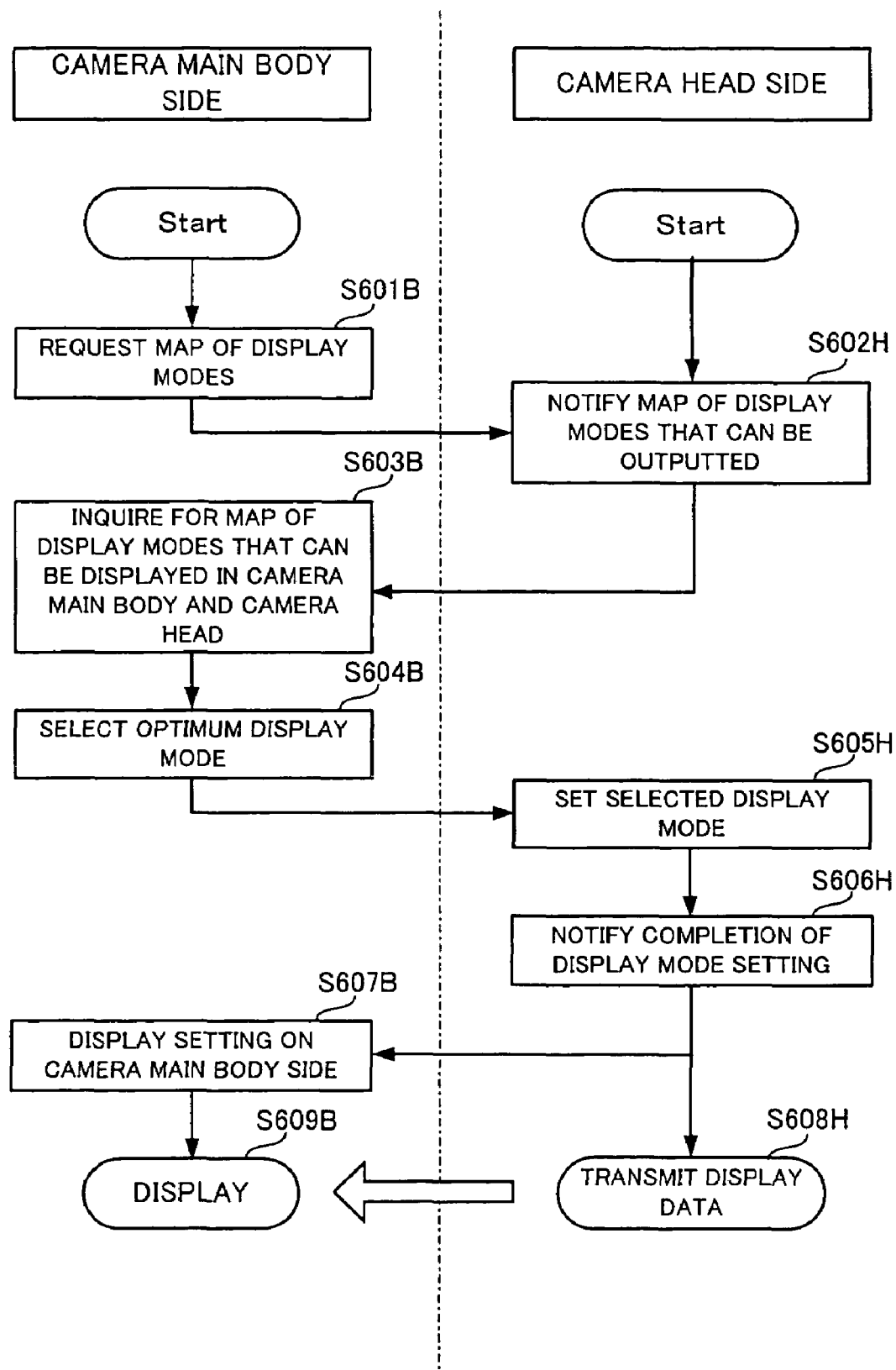
FIG. 6 is a flowchart showing a procedure of initialization processing concerning display modes, which is performed by a main body CPU when the camera head is attached to the main body.

FIG. 6 is a flowchart showing a procedure of initialization processing concerning display mode setting performed between the camera head 1a and the camera main body 1b. With reference to FIG. 6, processing of setting a display mode will be described.

Note that processing on the camera main body side is performed by the main body CPU 100b, and the processing on the camera head side is performed by the head CPU 19a. In the following description, the processing performed by the main body CPU is denoted by adding a reference mark B at the end for indicating the processing on the camera body side. Meanwhile, the processing performed by the head CPU is denoted by adding a reference mark H at the end for indicating the processing on the camera head side.

First, in step S601B, the main body CPU 100b transmits a map request of (a request for transmission) display modes from the camera main body 1b side to the camera head 1a side. In response to the map request, the head CPU sends back to the camera main body a map of display modes that can be outputted by the camera head 1a side in step S602H.

Upon receipt of the map, the main body CPU 100b starts to inquire for display modes that can be displayed on the LCD panel with reference to the received map. To be more specific, in step S603B, the main body CPU 100b compares the first mode list, which is previously stored in the nonvolatile memory 102b and which shows modes of image signals that enable display of moving images on the LCD panel by the display section (the LCD control section 105b and the LCD 1050b), with the notified second mode list, which shows modes of image signals that can be generated in the signal processing by the through image signal processing section 103a. Thereafter, one of the corresponding modes is selected. Subsequently, in step S604B, the selected display mode is notified to the camera head. Upon receipt of the notification, the head CPU 19a sets the display mode notified from the camera main body side in the through image signal processing section 103a. After setting of the display mode is completed, a display mode setting completion notification is transmitted to the main body CPU 100b. Upon receipt of the notification, the main body CPU 100b sets the display mode in the LCD control section. Thereafter, the head CPU 19a allows the through image signal processing section 103a to start generating a through image signal to be display data and to transmit the signal to the camera main body side. Upon receipt of the through image signal, the main body CPU 100b transfers a through image based on the through image signal to the LCD control section 105b and allows the LCD control section to display the through image on the LCD panel. Thus, the flow of the processing is finished.

FIG. 7 is a view showing lists of display modes of both of the camera main body 1b and the camera head 1a.

In part (a) of FIG. 7, display modes are sequentially listed from a rough display mode with a small number of display pixels to a high-definition display mode with a large number of display pixels. Moreover, part (a) of FIG. 7 also shows the number of pixels required for display in each of the display modes and a frame rate required for moving image display. Furthermore, next to the frame rate, it is indicated by the characters "Available (possible)" whether or not display can be performed on the display screen in each of the display modes.

The word "Available (possible)" indicates that display can be performed on the LCD in the display mode on the camera main body side, and indicates that the through image signal can be outputted in the display mode by processing at the through image signal processing section 103a on the camera head side.

This means that the main body CPU 100b and the head CPU 19a perform processing of selecting a mode in which the image signal can be displayed (Available) among the display modes.

For example, in the display mode of VGA (640×480), the processing can be performed on both of the camera main body 1b side and the camera head 1a side. In this example, as shown in part (b) of FIG. 7, it is understood that the processing is possible in three display modes including QVGA, VGA and SXGA.

Therefore, as shown in part (c) of FIG. 7, the main body CPU 100b selects SXGA (the hatching area) which has the largest number of pixels and has the same frame rate of 30 fps as that of a broadcast signal, and performs display.

Accordingly, it is possible to select the mode with a resolution which enables the highest-definition display of an image, among the common display modes in both of the camera head side and the camera main body side. Thus, a clear through image can be displayed.

As described above, the camera system capable of suitably displaying the through image is realized.

Figure 8:
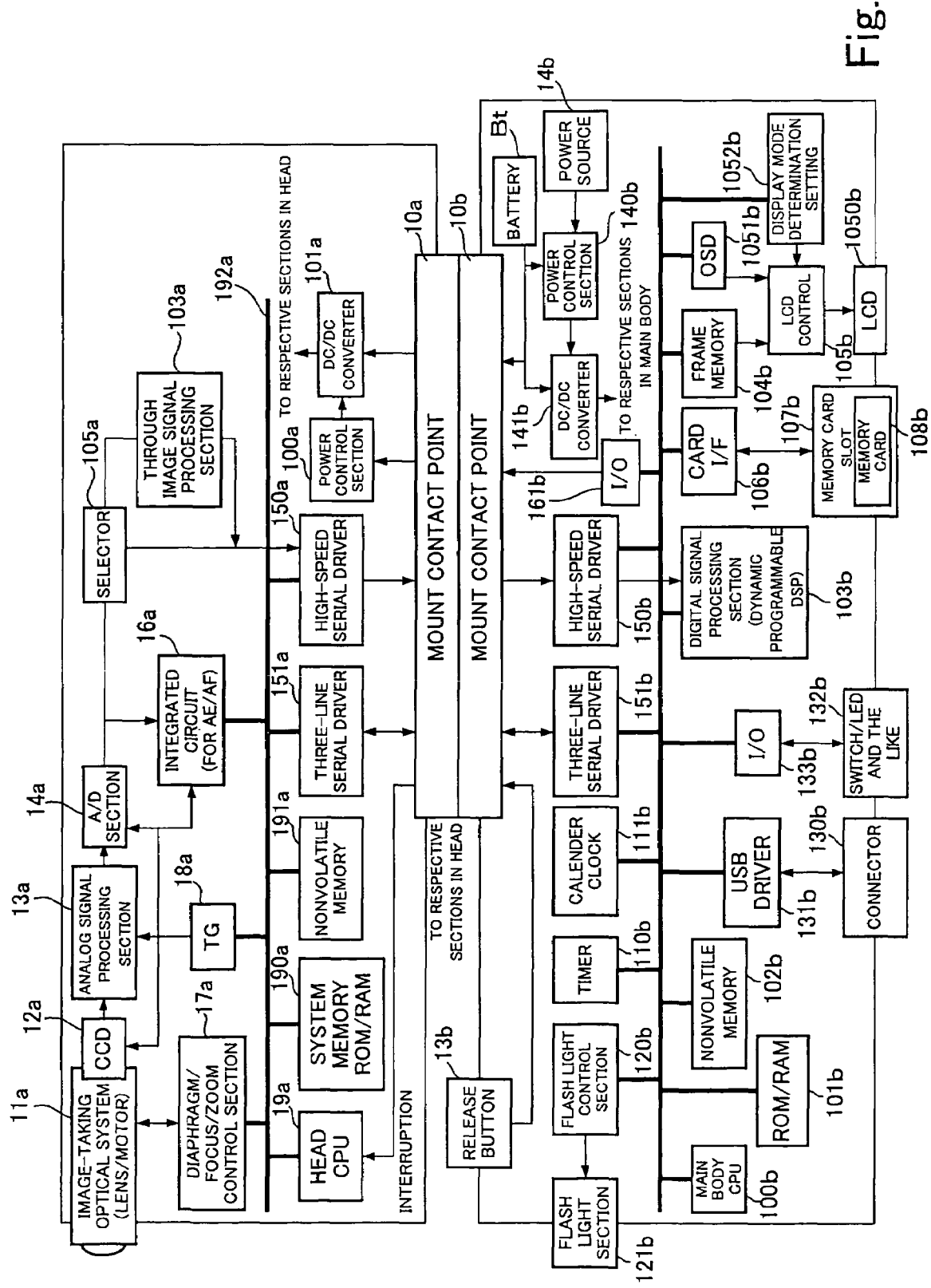
FIG. 8 is a view explaining an example of a modified case. In this case, in order to reduce loads on a head CPU and the main body CPU, a selector is provided subsequently to an A/D section on the camera head side for improvement of making route selection to be easily performed. Moreover, a display mode determination setting section is added to a display section on the camera main body side, and the display mode determination setting section performs processing of selecting a display mode among those in display mode lists.

FIG. 8 is a view showing a second embodiment.

In a camera system shown in FIG. 8, description will be given of processing in the case where there is no corresponding display mode, when a display mode list on a camera head side and a display mode list on a camera main body side are compared.

This camera system has a configuration similar to that shown in FIG. 2. However, in addition to the configuration shown in FIG. 2, a selector 105a is added subsequently to the A/D section 14a on the camera head 1a side, and a display mode determination setting section 1052b is added on the camera main body 1b side.

Figure 9:
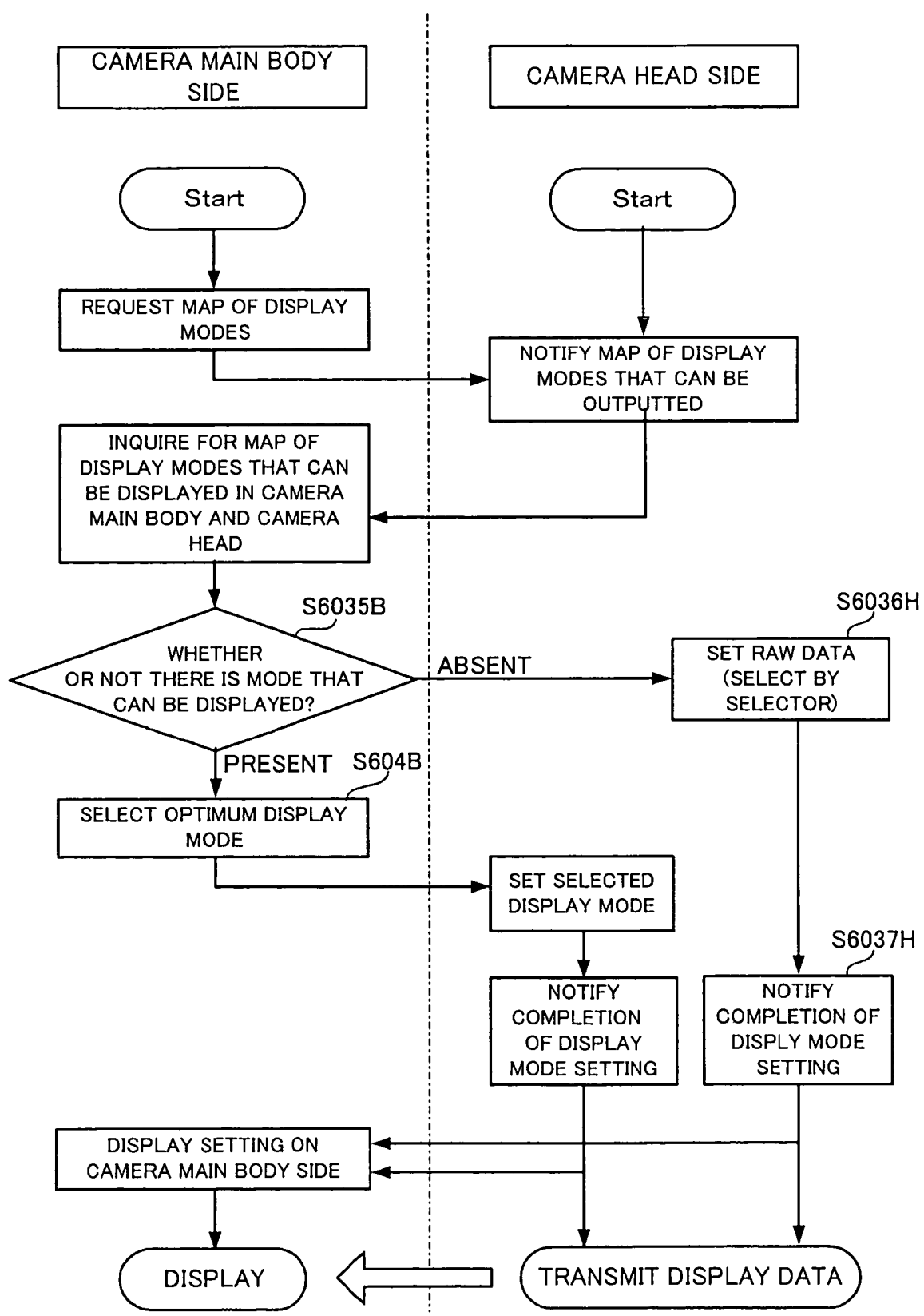
FIG. 9 is a view showing a procedure of initialization processing executed between the camera main body and the camera head concerning to display when the configuration of FIG. 8 is adopted.

FIG. 9 is a view showing a procedure of initialization processing concerning display executed between the camera main body 1b and the camera head 1a in the camera system having the configuration shown in FIG. 8.

Although the processing is approximately the same as that shown in FIG. 6, a determination step S6035B, which is executed by the display mode determination setting section 1052b under control of the main body CPU 100b, is added. Moreover, when it is determined in the determination step S6035B that there is no mode that can be displayed, the camera main body side requests the camera head side to transmit RAW data. In response to the request, in step S6036H, the head CPU 19a switches the selector 105a subsequent to the A/D section 14a and prepares for transmitting the RAW data to the camera main body. Next, in step S6037H, the head CPU 19a notifies the camera main body of completion of the preparation for transmitting the RAW data.

Accordingly, when there is no corresponding display mode, an image based on the RAW data can also be displayed as a through image.

However, as described in "SUMMARY OT THE INVENTION", even if the through image based on the RAW data is displayed on the display screen, a user looking at the image may feel as if he/she is looking at an unfamiliar image. Thus, here, by displaying the through image based on the RAW data, it is intended to have an effect such as notifying the user of a caution that image-taking may still be performed although there is incompatibility between the camera head and the camera main body.

Accordingly, when the both display modes do not coincide with each other, the image based on the RAW data is displayed as the through image, whereby it is possible to allow the user to determine whether or not to perform image-taking, without excessively performing processing of prohibiting image-taking.

Although, in the above, the clear display of the through image has been described, power consumption is increased if the display mode with an excessively large number of pixels is used in displaying the through image. If the display mode with the largest number of pixels is selected among the common display modes, and is set, and then, the display in this mode is continuously performed when a remaining level of the battery Bt is low, the battery eventually runs out and the camera system stops its operations.

For example, when a battery remaining level detection section, which is provided to the camera main body, detects that the remaining battery level is getting lower, the display mode is switched to one that reduces the power consumption. In this way, the power consumption of the battery used in the camera system is reduced.

Figure 10:
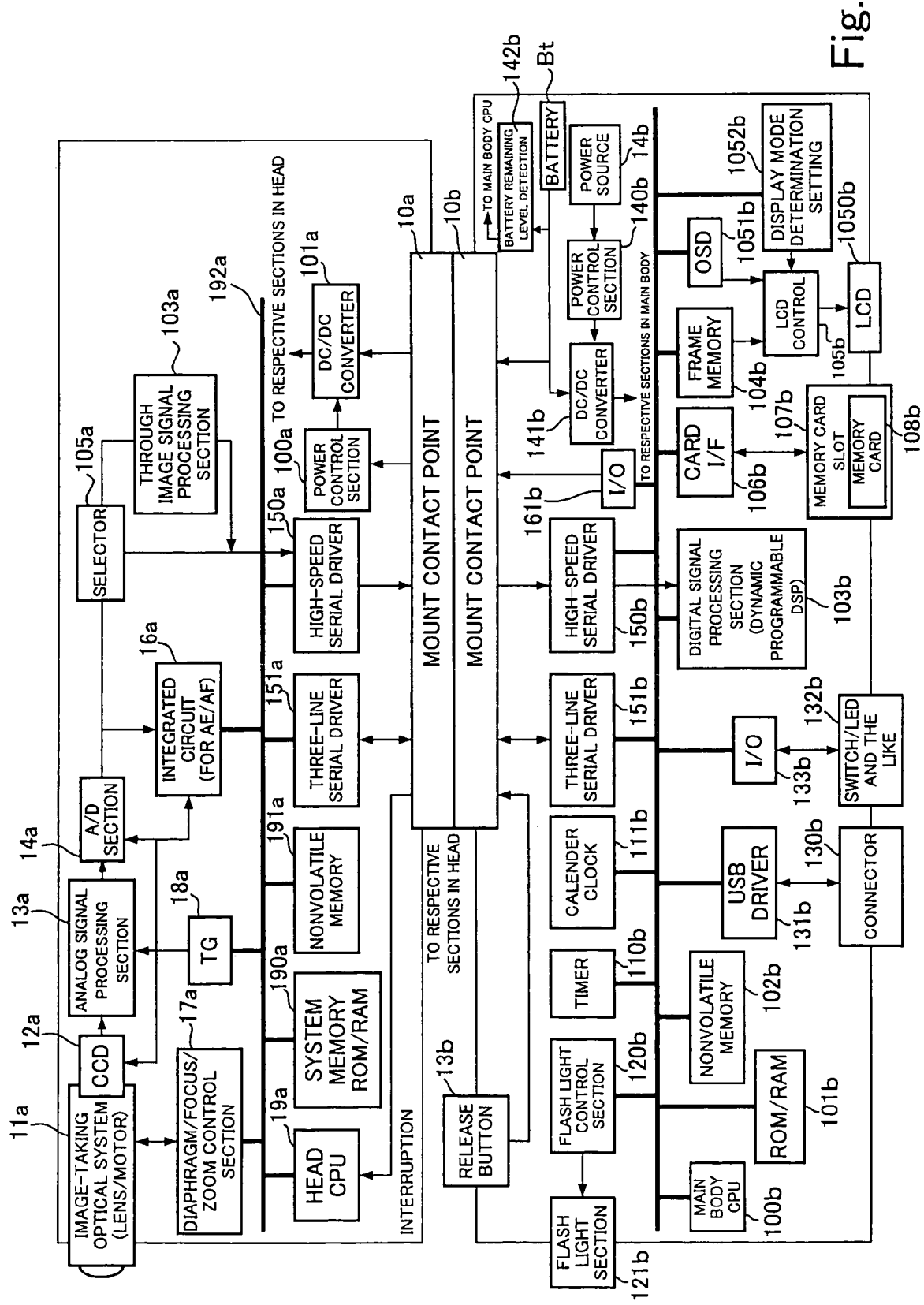
FIG. 10 is a view showing an example of a case where a battery remaining level detection section is provided and the display mode is changed in response to a battery remaining level.
Figure 11:
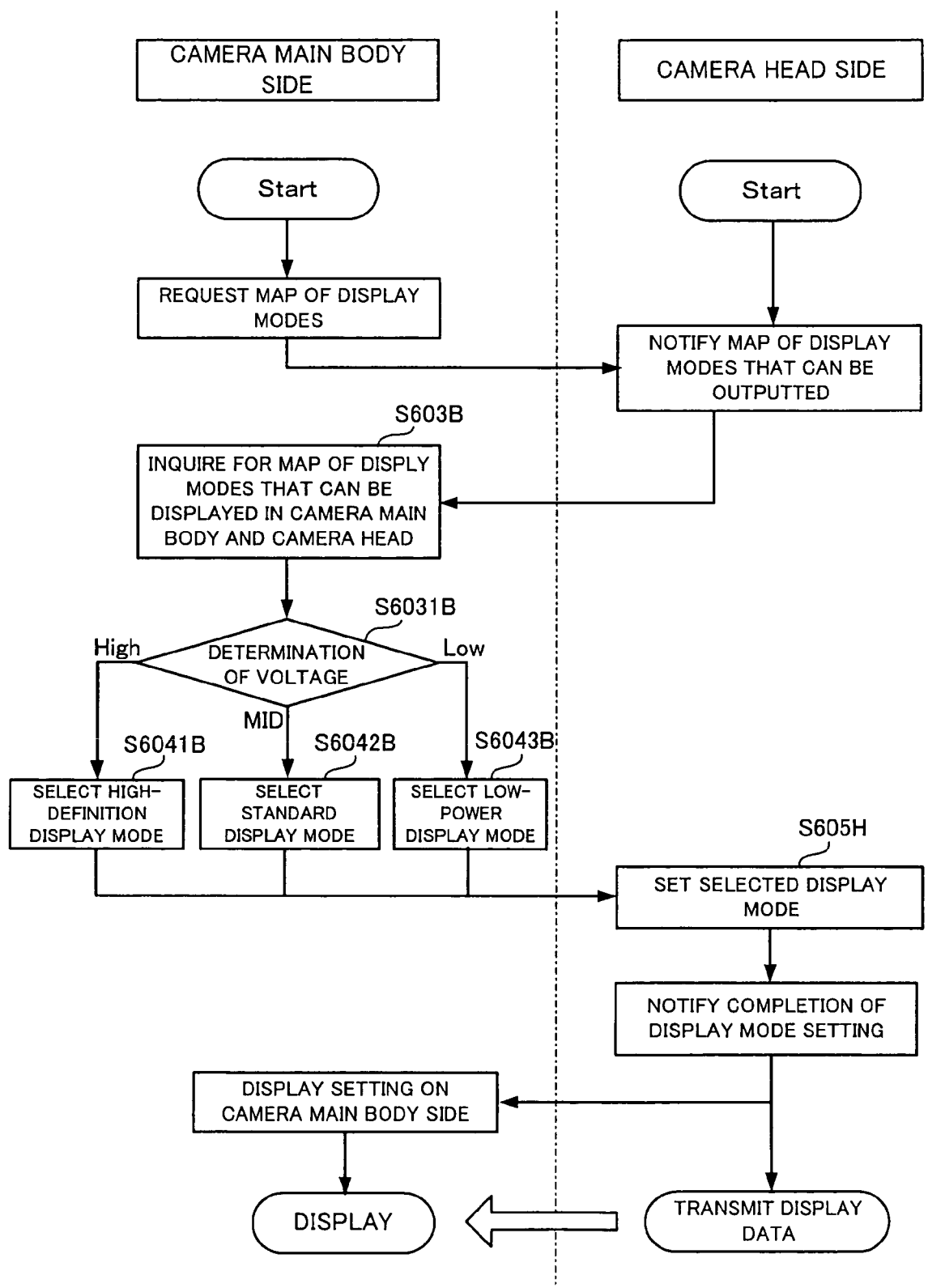
FIG. 11 is a view showing a procedure of initialization processing executed between the camera main body and the camera head concerning to display when the configuration of FIG. 10 is adopted.

FIG. 10 is a view showing an example of a case where a battery remaining level detection section 142b is provided and the display mode is changed according to the remaining level of the battery Bt. FIG. 11 is a view showing a procedure of initialization processing concerning display executed between the camera main body and the camera head in the configuration shown in FIG. 10.

As shown in FIG. 10, a voltage detected by the battery remaining level detection section 142b is notified to the main body CPU 100b, and the remaining level of the battery Bt is detected by the main body CPU 100b.

Although the processing shown in FIG. 11 is approximately the same as that shown in FIG. 6, steps S603 and S604 in FIG. 6 are changed to a voltage determination step S6031B, which is executed by the battery remaining level detection section 142b, and selection steps from S6041B to S6043B, which select one of display modes depending on the determination results.

In this example, a change is made so as to notify the camera head of a display mode in the following manner. In step S6031B, when it is determined that the voltage is relatively high, the processing moves to HIGH side and a high-definition display mode is selected. On the other hand, in step S6031B, when it is determined that the voltage is lower than that determined as the high voltage in the above, the processing moves to MID(DLE) side and a standard display mode, which relatively saves the power consumption, is selected. Moreover, when it is determined that the voltage is further lower than that in the MID(DLE) state, the processing moves to LOW side and a display mode, which further saves the power consumption, is selected.

Accordingly, in the case where the battery remaining level is high, the display mode with a large number of pixels can be selected. Moreover, according to the battery remaining level, it is possible to suitably switch to the display mode with a smaller number of pixels, the display mode saving the power consumption more.

FIG. 12 is a view for explaining differences in power consumption among the display modes.

Part (a) of FIG. 12 shows plural display modes which have a rank of the number of pixels as one item. In part (b) of FIG. 12, it is indicated whether or not the respective display modes can be processed by the camera main body or the camera head by use of word "Available".

As shown in part (a) of FIG. 12, the larger the number of pixels in the display mode, the more the power consumption is increased. In this example, in the case where the processing moves to HIGH side in the determination step S6031B in FIG. 11, the SXGA display mode is selected as shown in part (b) of FIG. 12. Moreover, when it is determined that the voltage is slightly lowered, the processing moves to MID(DLE) side and the XGA display mode which has the frame rate of 30 fps is selected. Furthermore, when the processing moves to LOW side, the VGA display mode is selected. Consequently, reduction in the power consumption is realized In this way, when the battery is getting low, a load on the display section is reduced, and then, an effect of holding off the battery drain can be obtained.

Furthermore, a description will be given of an example of a case where the camera system includes not only the battery but also an AC adaptor which receives power supply from a commercial power source.

Figure 13:
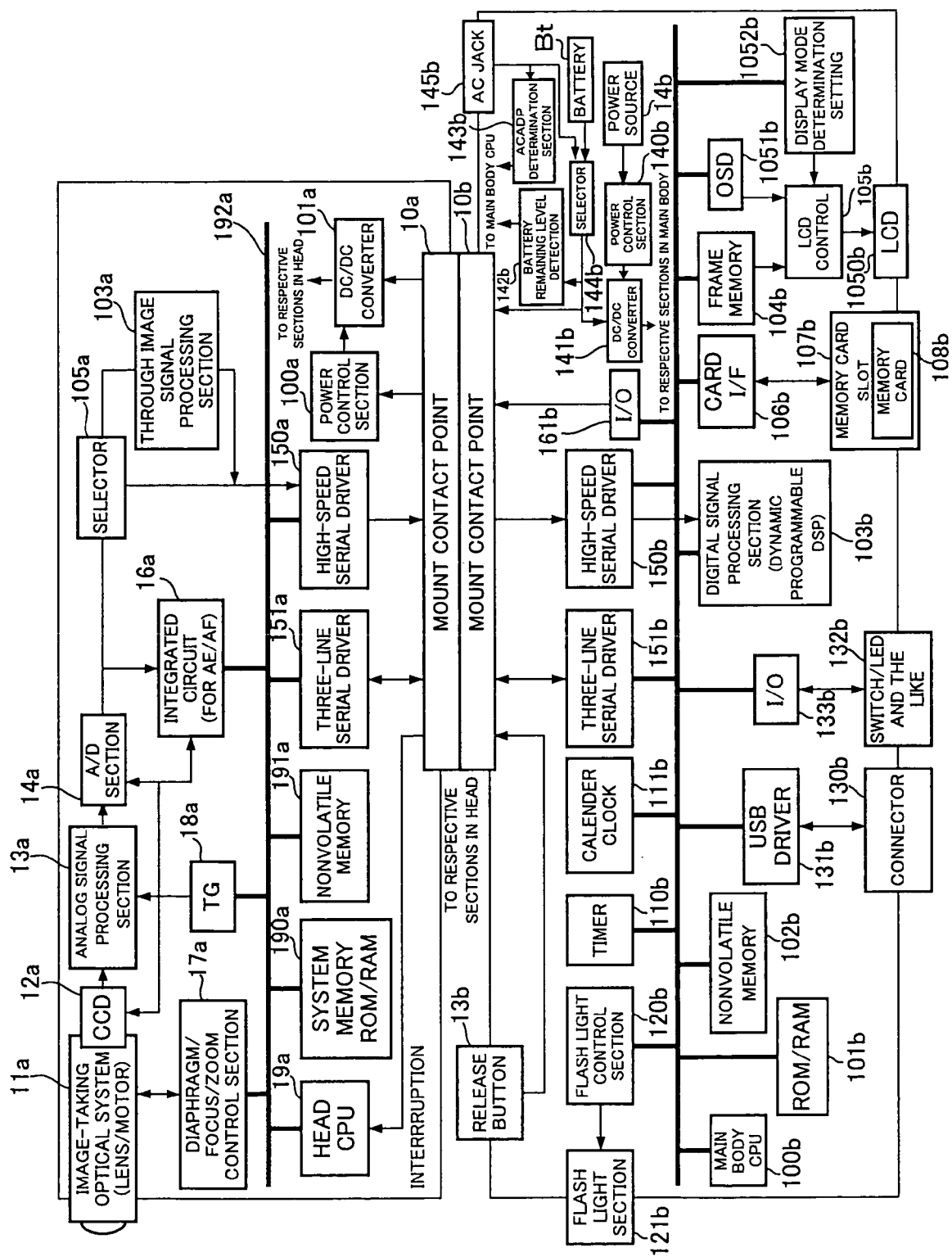
FIG. 13 is a view showing a configuration in the case where an AC jack is provided to make it possible to receive power supply from a commercial power source.

FIG. 13 is a view showing a configuration in the case where an AC jack is provided to make it possible to receive power supply from the commercial power source.

As shown in FIG. 13, input to the DC/DC converter 141b is switched between AC input and DC input by a selector 144b. In this event, an ACADP determination section 143b notifies the main body CPU of the event that a plug attached to a tip of a power cord extended from the AC adaptor is inserted into the AC jack 145b. Moreover, at this time, the selector 144b is operated so as to automatically switch a route inside the selector 144b to the AC input side.

Figure 14:
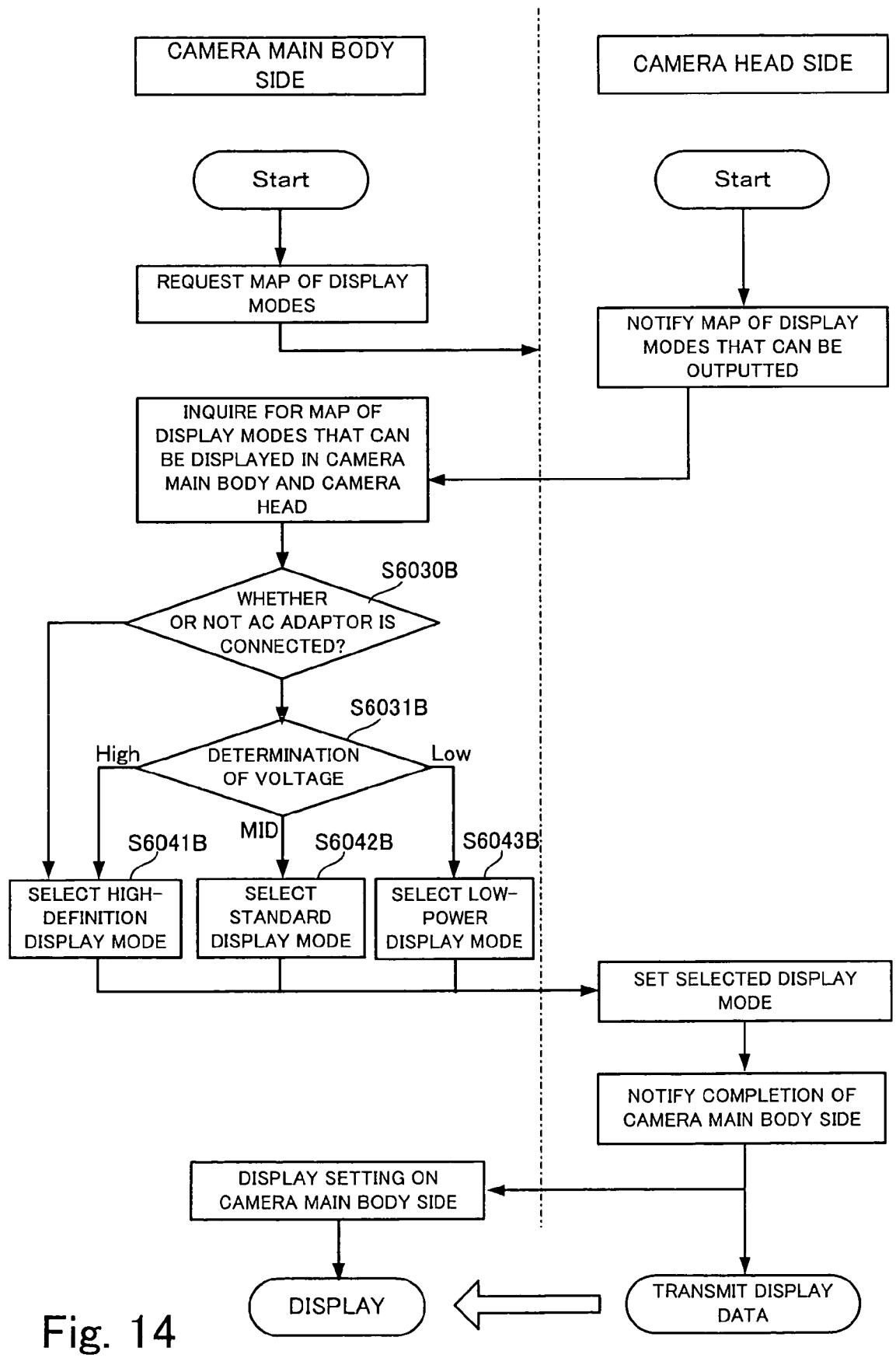
FIG. 14 is a view for explaining processing in the case where it is detected that an AC adaptor is attached to the AC jack.

FIG. 14 is a view showing a procedure of initialization processing concerning display executed between the camera main body 1b and the camera head 1a in the configuration of FIG. 13.

Although the processing is similar to that shown in FIG. 11, a determination step S6030B for detection of the AC adaptor is added. The step is performed by the ACADP determination section 143b. When the power is supplied from the commercial power source, the processing unconditionally moves to step S6041B and a high-definition display mode is selected. When it is determined that the AC adaptor is not connected, the same processing as that shown in FIG. 11 is performed to save the power consumption of the battery.

In this way, in response to a change in situations such as the remaining power level and connection of the adaptor, the power control is adaptively performed. Thus, a more user-friendly camera system is realized.

As described above, the camera system capable of suitably displaying the through image is realized. Moreover, in the display mode with a large number of pixels, the power is consumed excessively from the viewpoint of the battery remaining level. Therefore, a camera system, with which the user can enjoy shooting for a longer period of time, is realized by adjusting display resolution to suppress the power consumption in response to the battery remaining level.

Furthermore, by adopting the configuration in which the power supply can be received from the commercial power source by use of the AC adaptor, it is also possible to shoot at good shooting moments while fixing the camera system to a tripod or the like and looking at the through image.

What is claimed is:

1. A camera system including a camera head including an image-taking optical system and an image pickup device; and a camera main body which has the camera head detachably attached thereto, receives an image signal from the camera head, and performs signal processing, wherein the camera head includes a moving image signal processing section which performs signal processing of an image signal for display, the image signal representing a moving image generated by the image pickup device, and transmits to the camera main body the image signal processed by the moving image signal processing section, and the camera main body includes a display screen which displays an image thereon, and a display section which displays a moving image on the display screen based on the image signal representing the moving image, the image signal being received from the camera head;

a mode selection section which compares a first mode list showing modes of image signals that enable display of moving images on the display screen by the display section with a second mode list showing modes of image signals that can be generated by the signal processing in the moving image signal processing section, and which selects one of the corresponding modes, wherein the moving image signal processing section performs signal processing for the image signal representing the moving image in the mode selected by the mode selection section, and wherein, when any mode in the first list is incompatible with any mode in the second mode list, the camera head transmits the image signal representing the moving image to the camera main body without performing signal processing.

2. The camera system according to claim 1, which is operated by power from a battery, the camera system further comprising:

a battery remaining level detection section which detects a battery remaining level, wherein the mode selection section selects a mode in response to the battery remaining level detected by the battery remaining level detection section among the corresponding modes.

3. The camera system according to claim 1, wherein the display section displays the mode selected by the mode selection section on the display screen.

4. The camera system according to claim 1, wherein the mode selection section selects a mode in response to a user operation.

5. A camera system including a camera head including an image-taking optical system and an image pickup device; and a camera main body which has the camera head detachably attached thereto, receives an image signal from the camera head, and performs signal processing, wherein the camera head includes a moving image signal processing section which performs signal processing of an image signal for display, the image signal representing a moving image generated by the image pickup device, and transmits to the camera main body the image signal processed by the moving image signal processing section, and the camera main body includes a display screen which displays an image thereon, and a display section which displays a moving image on the display screen based on the image signal representing the moving image, the image signal being received from the camera head; and a mode selection section which compares a first mode list showing modes of image signals that enable display of moving images on the display screen by the display section with a second mode list showing modes of image signals that can be generated by the signal processing in the moving image signal processing section, and which selects one of the corresponding modes, wherein the moving image signal processing section performs signal processing for the image signal representing the moving image in the mode selected by the mode selection section, and, wherein the moving image signal processing section is shifted to an inoperative state when any mode in the first list is incompatible with any mode in the second mode list.

* * * * *